Aug. 18, 1936.   L. R. TITCOMB   2,051,355
VALVE
Filed June 29, 1932
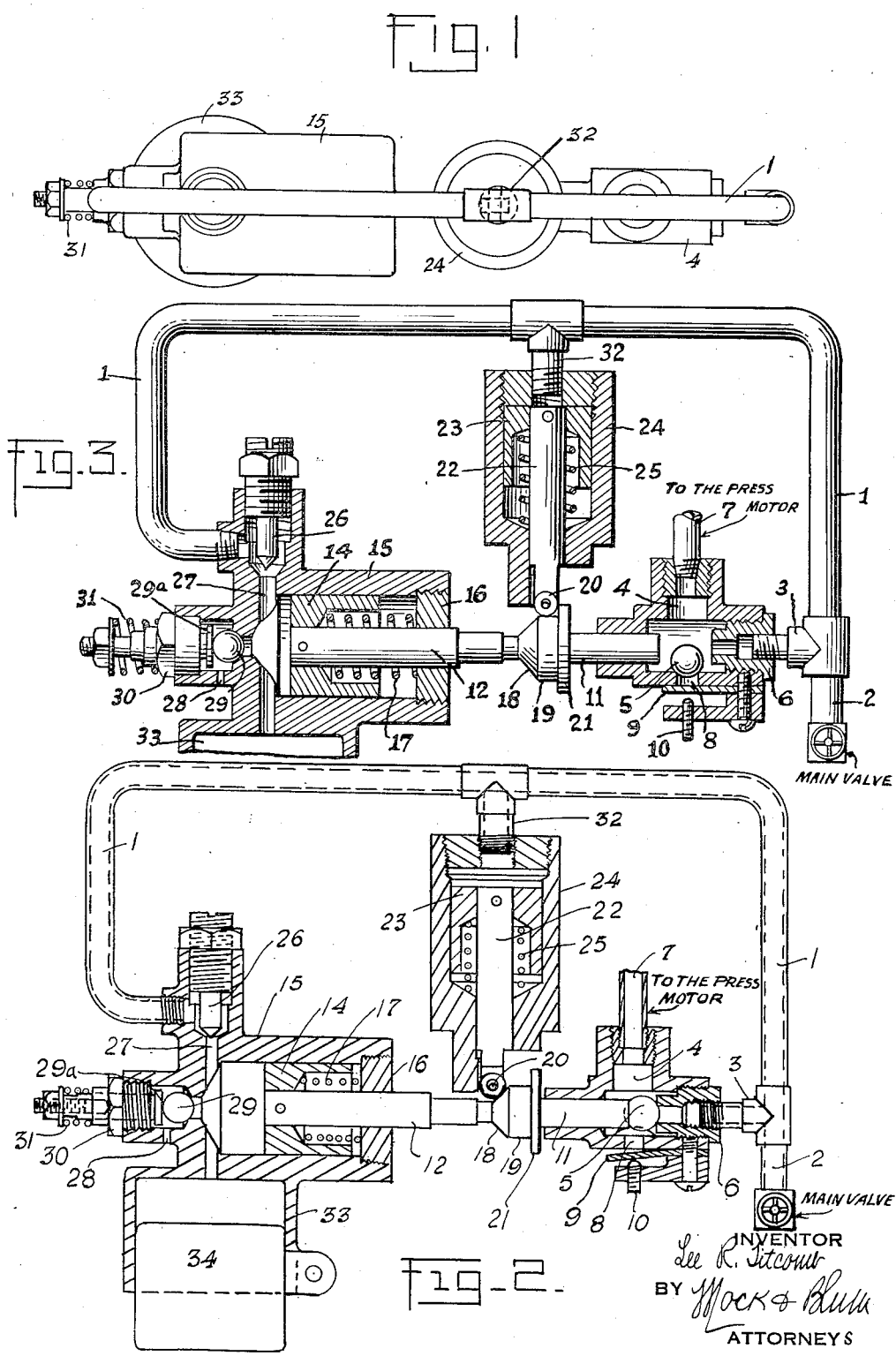

Patented Aug. 18, 1936

2,051,355

UNITED STATES PATENT OFFICE 2,051,355

VALVE

Lee R. Titcomb, New Haven, Conn.

Application June 29, 1932, Serial No. 619,818

3 Claims. (Cl. 121—46.5)

My invention relates to a new and improved valve.

One of the objects of my invention is to provide a new and improved valve which shall be of simple and cheap construction and which will have great delicacy and certainty of operation.

Another object of my invention is to produce a control valve which shall be useful in controlling the operations of various mechanisms such as glass-forming presses, grinding machinery, machinery for bending, working and generally shaping metal and other types of machinery.

Fig. 1 is a top view.

Fig. 2 is an elevation partially in section.

Fig. 3 is a view which corresponds to Fig. 2, showing the parts in position when the valve opens the inlet of the apparatus.

The valve control device is connected by means of the pipe 1 to any suitable source of air or other fluid under pressure, said source being connected to the inlet 2. The air-line pipe 1 is connected by means of a suitable connecting pipe 3 to a chamber 4 which is provided with a ball-valve 5, which is provided with a suitable seat at the inner end of a bushing 6 which is threaded into the inlet end of the wall of the chamber 4. The chamber 4 is also provided with an outlet pipe 7 which is connected to the press or to the other mechanism, so that the press or other mechanism is operated by the compressed air or the like which is sent through the pipe 7. In the position shown in Fig. 2, the ball-valve 5 is in its closing position, so that the supply of power to the press or the like is cut off. The wall of the chamber 4 is also provided with an exhaust opening 8 so that the air can be exhausted from the press or other power device when the ball-valve 5 is in its closing position. The leakage of air from the exhaust port 8 can be controlled by the resilient valve member 9, whose position is adjusted by means of the adjustment screw 10.

The ball-valve 5 is held in its closing position by a plunger or piston rod 11, which fits in a piston-like manner within the corresponding portion of the wall of the chamber 4, in order to produce an air-tight fit. The plunger 11 can be pushed inwardly by means of the rod 12 of a piston 14, which moves slidably within a cylinder 15. A plug or cover 16 is connected by threading to the wall of the cylinder 15, and this plug 16 provides a bearing for the piston rod 12.

A compression spring 17 has one end abutting the plug 16, and the other end of said spring bears against the piston 14 so that said spring 17 tends to move the piston rod 12 to the left of the position shown in Fig. 2. It will be noted that the piston rod 12 has an inclined or cam part 18, and a cylindrical part 19. When the spring 17 is free to operate, the piston rod 12 is moved to the left until the roller 20 contacts with the cylindrical portion 19 of the piston rod 12 and the head 21 of the piston rod 12 acts as a stop to prevent the further movement of the piston 14, because said head 21 then abuts the roller 20.

The roller 20 is turnably connected to the lower end of a piston rod 22, which is suitably connected to a piston 23, which is slidably mounted within a cylinder 24. The outer end of the piston rod 22 fits loosely within the corresponding portion of the inner wall of the cylinder 24, so that a bearing is provided, but the fit is not air-tight. A compression spring 25 has its lower end abutting the tapered portion of the inner wall of the cylinder 24 so that said compression spring 25 tends to raise the piston 23 until the roller 20 rides off the cam portion 18 of the piston rod 12. The air-line pipe 1 is connected to the cylinder 15, and a needle-valve 26 is provided in order to regulate the admission of compressed air, water under pressure, or the like, into the cylinder 15. The needle-valve 26 controls a port 27, which communicates with an outlet or exhaust port 28, said communication being controlled by a ball-valve 29. In the position of the parts shown in Fig. 2, the ball valve 29 shuts off communication between the ports 27 and 28. The ball 29 can be manually forced into the closing position shown in Fig. 2 by means of a pin having a head 29a. Said pin has a suitable bearing in a plug 30 which is suitably threaded into the adjacent end of the extension of the cylinder 15. A compression spring 31 has one end abutting an extension of the head of the plug 30 and the other end of said compression spring 31 abuts an enlargement of said control pin. Hence, said spring 31 normally holds the control pin in a position to the left of that shown in Fig. 2, so that the ball 29 then moves away from its seat, but without obstructing the outlet port 28.

The operation of the device is as follows:—

When the air supply is connected to the inlet 2, which can be done by opening a suitable main valve, the piston rod 12 is to the left of the position shown in Fig. 2, so that the roller 20 contacts with the cylindrical portion 19 of the piston rod 12, and the piston 23 is in its upper position.

The air pressure can then push the ball-valve 5 away from the position shown in Fig. 2, because the plunger 11 can then be moved outwardly or to the left. If desired, the plunger 11 can be made integral with or it can be suitably connected to the head 21. When the ball-valve 5 falls away from the position shown in Fig. 2, it falls upon and it closes the exhaust port 8. The full air supply is then sent through the pipe 7 to the mechanism to be operated. The air which enters the cylinder 15 can pass through the port 27 and out through the port 28, because the spring 31 holds the control pin in such position that the ball-valve 29 can fall away from its seat but without closing the exhaust port 28.

When it is desired to stop the operation of the press or other mechanism, the pin can be pushed by any suitable means inwardly. When the ball-valve 29 is held in the position shown in Fig. 2, the compressed air which enters through the passage 27 then urges the piston 14 and the piston rod 12 to the position shown in Fig. 2, so that the compressed air which enters the cylinder 24 through the inlet 32, is free to downwardly push the piston 23 against the force of the compression spring 25. The pressure which is thus exerted by the roller 20 assists in forcing the piston rod 12 and the plunger 11 to the right, although this additional force is not necessary. The ball-valve 5 is thus forced to the closing position shown in Fig. 2, so that compressed air is no longer supplied to the chamber 4 and the air can leak out of the chamber 4 and out of the operating parts of the mechanism, through the controlled exhaust port 8. The operation of the press or the like can therefore be regulated with great delicacy.

The plunger 11 is held in the position shown in Fig. 2 until the supply of compressed air to the pipe line 1 is discontinued, because the pressure of the roller 20 keeps the ball-vave 5 in the closing position shown in Fig. 2. Hence, even if the ball-valve 29 is allowed to move away from the closing position shown in Fig. 2, so that the air can leak out of the cylinder 15, there is sufficient air pressure in the cylinder 24 to prevent air from being supplied through the pipe 7. The piston 23 has a larger cross-section than valve 5. Since the same unit pressure is exerted against valve 5 and piston 23, the total pressure against piston 23 is much greater than the total pressure against valve 5.

The effective volume of the air chamber within the cylinder 15 can be controlled by means of the hollow extension 33, and the adjustable plug 34.

The cross-section of the piston 23 is made sufficiently large and the taper of the cam part 18 is properly designed, so that the air pressure against the ball-valve 5 is insufficient to move the piston rod 12 to the left of the position shown in Fig. 2. Hence, the parts remain in the position shown in Fig. 2 even if the ball-valve 29 is away from its seat. When the supply of compressed air or other fluid under pressure to the pipe 1 is discontinued, the air within the chamber 4 leaks out of the opening or port 8 so that the moving part of the mechanism which is being controlled is moved back to its initial position. When the pressure within the cylinder 24 has been sufficiently lowered, the spring 25 raises the piston 23 to its upper position and the spring 17 then moves the piston 14 and the rod 12 to its initial position, in which the roller 20 contacts with the cylindrical portion 19 of the piston rod 12.

Air under pressure or the like can then be again supplied to the air-line 1.

Experience has shown that the method of control specified herein is of great delicacy and accuracy, especially if it is desired to uniformly press articles made of glass, such as lenses and the like.

For convenience, the valve 5 can be designated as the pressure control valve, the piston rod 12 can be designated as the actuating device or means for the pressure-control valve 5, and valve 29 can be designated as the pilot valve, and the cylinder 24 and its associated parts can be designated as the retaining means for holding the pressure-control valve 5 in its operative position.

While I have shown a complete combination of working parts, it is clear that the invention embraces numerous valuable sub-combinations which could be used independently of the complete device herein.

I claim:—

1. A valve control device for a machine to be operated by fluid pressure, said device comprising a pipe adapted to be connected to a source of fluid under pressure, a first chamber connected to said pipe and having an inlet port and an outlet port, the outlet port being adapted to be connected to the machine, said first chamber having a movable valve adapted to close said inlet port and movable away from said inlet port under the fluid pressure, a second chamber connected to said pipe-line, fluid-operated means in said second chamber for retaining said valve in closing position, the effective force of said fluid-operated means sufficiently exceeding the effective pressure on said valve so that said valve is held in the closing position until the supply of fluid under pressure to said pipe is discontinued, and actuating means for forcing said valve to the closing position, said actuating means being fluid-actuated and being located in a third chamber which is connected to said pipe, said third chamber including an exhaust port, and a valve for controlling said exhaust port of the third chamber.

2. A valve control device for a machine to be operated by fluid pressure, said device comprising a pipe adapted to be connected to a source of fluid under pressure, a first chamber connected to said pipe and having an inlet port and an outlet port, the outlet port being adapted to be connected to the machine, said first chamber having a movable valve adapted to close said inlet port and movable away from said inlet port under the fluid pressure, a second chamber connected to said pipe-line, fluid-operated means in said second chamber for retaining said valve in closing position, said fluid-operated means including a piston which abuts an inclined wall of a rod which is adapted to move said valve to its closing position, the effective force of said fluid-operated means sufficiently exceeding the effective pressure on said valve so that said valve is held in the operative position until the supply of fluid under pressure to said pipe is discontinued, and actuating means for forcing said valve to the operative position, said first chamber having exhaust means controlled by said valve.

3. A valve control device for a machine to be operated by fluid pressure, said device comprising a pipe adapted to be connected to a source of fluid under pressure, a first chamber connected to said pipe and having an inlet port and an outlet port, the outlet port being adapted to be connected to the machine, said first chamber having a movable valve adapted to close said inlet port and movable away from said inlet port under the fluid pressure, a plunger slidably located in said first chamber and adapted to be moved inwardly to force said valve to the closing position, said plunger having a beveled part and an adjacent cylindrical part, a first cylinder connected to said pipe and having a first piston having a rod adapted to press upon said beveled part to hold the plunger in a position in which it maintains the valve in its closing position, said rod pressing upon the adjacent cylindrical part of said plunger when the plunger is out of the position in which it holds said valve in closing position, a second cylinder connected to said pipe and having a piston which is connected to said plunger, said second cylinder having an exhaust, and a movable pilot valve adapted to control said exhaust, the force of said first piston against said beveled part being sufficient to hold said plunger in its operative position until the supply of fluid to said pipe is discontinued.

LEE R. TITCOMB.